US007083518B2

(12) United States Patent
Rowe

(10) Patent No.: US 7,083,518 B2
(45) Date of Patent: Aug. 1, 2006

(54) BONUS SYSTEM AND METHOD OF AWARDING A BONUS WITHOUT PLAYING A GAME

(75) Inventor: Rick Rowe, Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 10/460,625

(22) Filed: Jun. 11, 2003

(65) Prior Publication Data

US 2003/0207711 A1 Nov. 6, 2003

Related U.S. Application Data

(63) Continuation of application No. 09/903,095, filed on Jul. 10, 2001, now abandoned.

(51) Int. Cl.
*A63F 13/00* (2006.01)

(52) U.S. Cl. ............................ 463/29; 463/20; 463/25

(58) Field of Classification Search .................. 463/16, 463/22, 25, 29, 20, 40–42; 700/91–93
See application file for complete search history.

(56) References Cited

U.S. PATENT DOCUMENTS 5,292,127 A 3/1994 Kelly et al.
5,429,361 A 7/1995 Raven et al.
5,655,961 A 8/1997 Acres et al.
5,702,304 A 12/1997 Acres et al.
5,741,183 A 4/1998 Acres et al.
5,752,882 A 5/1998 Acres et al.
5,816,918 A 10/1998 Kelly et al.
5,820,459 A 10/1998 Acres et al.
5,823,879 A 10/1998 Goldberg et al.
5,836,817 A 11/1998 Acres et al.

(Continued)

FOREIGN PATENT DOCUMENTS

WO WO01/3425917 5/2001

OTHER PUBLICATIONS

EP Application No. 03749235.2-2218, PCT/US0327131, European Search Report mailed Jul. 10, 2005.

*Primary Examiner*—John M. Hotaling, II
(74) *Attorney, Agent, or Firm*—Beyer Weaver & Thomas, LLP

(57) ABSTRACT

A bonus system and a method of awarding a bonus associated with a gaming machine are disclosed. In one embodiment, the bonus system includes a player tracking system comprising a player tracking device at the gaming machine, a remote player tracking host and a network by which information may be sent to and from the player tracking device and player tracking host. The bonus system includes a bonus system host associated with the network, the bonus system host capable of generating bonus event information which is transmitted to the player tracking device at via the network. In one embodiment, the player tracking device includes a player tracking device controller and one or more peripherals, such as a card reader, display and speakers. Bonus event information is displayed and audible information is generated in response to the sending of bonus event information from the bonus event host to the player tracking device controller. In accordance with one method of the invention, a bonus may be awarded to a player independent of the outcome of play of a game on the machine, and independent of gaming controller activity presenting the game. In another embodiment, a bonus may be awarded to the first player to begin playing a gaming machine which is currently not in use.

7 Claims, 3 Drawing Sheets

U.S. PATENT DOCUMENTS

| | | | | |
|---|---|---|---|---|
| 5,871,398 | A | 2/1999 | Schneier et al. | |
| 5,876,284 | A | 3/1999 | Acres et al. | |
| 5,917,725 | A | 6/1999 | Thacher et al. | |
| 6,007,426 | A | 12/1999 | Kelly et al. | |
| 6,015,344 | A | 1/2000 | Kelly et al. | |
| 6,048,269 | A | 4/2000 | Burns et al. | |
| 6,135,884 | A | 10/2000 | Hedrick et al. | |
| 6,146,273 | A * | 11/2000 | Olsen | 463/27 |
| 6,162,122 | A | 12/2000 | Acres et al. | |
| 6,254,483 | B1 * | 7/2001 | Acres | 463/26 |
| 6,319,125 | B1 | 11/2001 | Acres | |
| 6,364,768 | B1 | 4/2002 | Acres | |
| 6,390,917 | B1 | 5/2002 | Walker et al. | |
| 6,636,892 | B1 * | 10/2003 | Philyaw | 709/217 |
| 6,840,860 | B1 * | 1/2005 | Okuniewicz | 463/35 |

* cited by examiner

BONUS SYSTEM AND METHOD OF AWARDING A BONUS WITHOUT PLAYING A GAME

RELATED APPLICATION DATA

This application is a continuation of U.S. patent application Ser. No. 09/903,095, filed Jul. 10, 2001 now abandoned.

FIELD OF THE INVENTION

The present invention relates to a bonus system and a method of awarding a bonus, and more particularly to such a system which is associated with one or more gaming devices of a gaming system.

BACKGROUND OF THE INVENTION

Consumers continually seek new, stimulating forms of entertainment. In the gaming area, game manufacturers and casinos continually offer new games to players. Some of these games are entirely new, involving differing steps of play. In other instances, new award schemes are presented, such as larger jackpots or payouts or more winning combinations.

One particular type of award scheme which is attractive to game players is a bonus scheme. A variety of such schemes exist. In general, the principle behind the scheme is the offering of a bonus award to a player of a game, the bonus being an award above and beyond a normal award which may be received by playing the game. For example, in one well known game called WHEEL OF FORTUNE® manufactured by International Game Technology of Reno, Nev., a player plays a base game. If the result of the base game is one of a predetermined number of winning outcomes, then the player is paid a reward or payout. In addition, if a certain result is obtained while playing the base game, then the player is provided an opportunity to spin a bonus wheel and win a bonus payout in addition to the reward or payout for receiving a winning result of the base game.

A new bonusing arrangement which is enticing to game players is desired.

SUMMARY OF THE INVENTION

A bonus system and a method of awarding a bonus are disclosed. In one or more embodiments, the bonus system is associated with a gaming machine and the method of awarding a bonus comprises awarding a bonus to a user or player of a gaming machine.

In one embodiment, the bonus system comprises at least a portion of an existing system or network. Preferably the other system or network is one which does not directly include a master gaming controller of the gaming device. In one embodiment, this other network comprises a player tracking system.

The player tracking system may have a variety of configurations. In one embodiment, the player tracking system comprises a player tracking device at the gaming machine, a remote player tracking host and a network by which information may be sent to and from the player tracking device and player tracking host. In one embodiment, the player tracking device includes a player tracking device controller and one or more peripherals, such as a card reader, display, keyboard, printer and speaker.

The bonus system includes a bonus system host associated with the player tracking network and capable of generating bonus event information which is transmitted to the player tracking device via the network. Bonus event information is displayed and audible information is generated in response to the sending of bonus event information from the bonus event host to the player tracking device controller.

One or more methods of awarding a bonus are provided. In a preferred embodiment, a bonus is awarded to a player or user of a gaming machine in a manner independent upon the outcome of game play on the gaming machine. In one or more embodiments, bonus event or award information is generated by a device independent of the master gaming controller of the gaming machine.

In accordance with one method of the invention, a bonus is randomly awarded to the player of a gaming machine. The bonus is awarded when play of the machine is detected by activation of player's player tracking card/account.

In another embodiment, a bonus may be awarded to the first player to begin playing a gaming machine which is currently not in use. The bonus may be awarded to the first player to activate their player tracking card/account at the machine.

The bonus which is awarded may have a variety of forms. In one embodiment, the bonus award may be a cash or coin award. In another embodiment, the bonus award may be credits or points. The points may be associated with a player's player tracking or reward account, such as by updating player points at a player file stored at a player tracking host. In another embodiment, the bonus may be a ticket issued by a receipt printer of the player tracking device. The ticket may be used as cash or credit, or be redeemable for cash, prizes or discounts.

Further objects, features, and advantages of the present invention over the prior art will become apparent from the detailed description of the drawings which follows, when considered with the attached figures.

DETAILED DESCRIPTION OF THE INVENTION

The invention is a method and system for awarding a bonus or award. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention is a bonus system and a method of awarding a bonus. By the term "bonus" it is meant an award, reward or the like. The bonus may have a variety of forms, including money, prizes such as tangible goods or free or reduced price goods or services, or points or other representative elements (tangible or intangible) which may be redeemed for goods, services and/or money. In general, the term "bonus" as used herein means an award, reward or the like which is provided other than as a normal result of a winning outcome of the play of a game.

Figure 1:
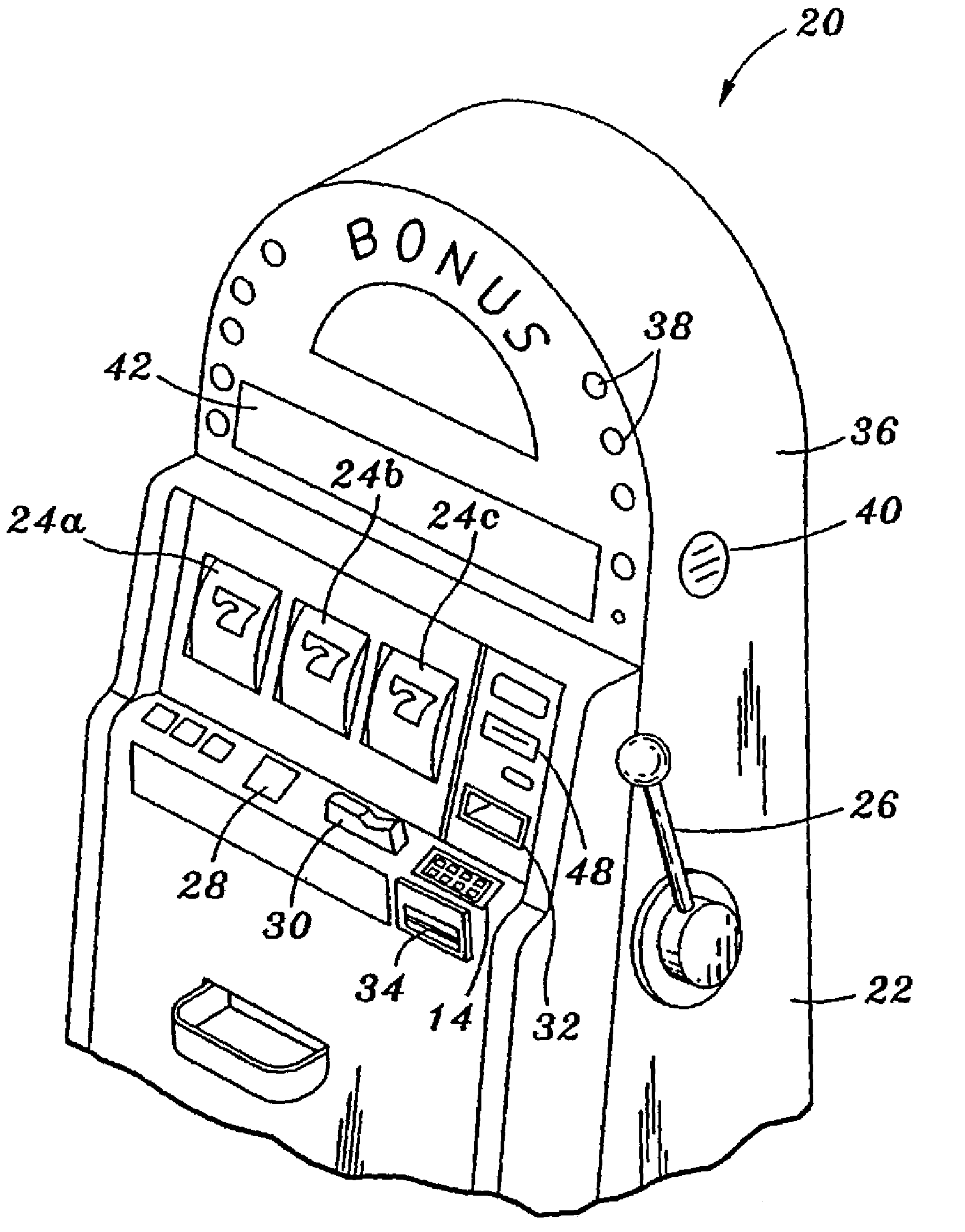
FIG. 1 is a perspective view of a portion of a gaming machine and associated player tracking and bonus system apparatus in accordance with an embodiment of the invention.

In one or more embodiments, the bonus system and method is associated with a gaming system including at least one gaming device. FIG. 1 illustrates one embodiment of such a gaming machine or device 20. In general, the gaming machine 20 is adapted to present at least one game for play to a player. As illustrated, the gaming machine 20 includes a housing 22 which supports and/or houses the various components of the gaming machine 20. In the embodiment illustrated, the gaming machine 20 is adapted to present a game of "slots," and includes three rotating reels 24*a, b, c.* A handle 26 or spin button 28 may be used to effectuate rotation of the reels 24*a, b, c.*

In this well known game, a player may be declared a winner of the game and awarded an award if the result of the rotation of the reels 24*a, b, c* is a predetermined combination of symbols. It should be understood that the gaming machine 20 may be adapted to present one or more of a wide variety of games. Depending upon the game presented, the configuration of the machine may vary. For example, in the event the gaming machine 20 is adapted to present the game of video poker, then the gaming machine 20 may include a video display.

In one or more embodiments of the invention, the gaming machine 20 is adapted to present a wager-type game. In this arrangement, a player is required to place a bet or wager in order to participate in the game. In the event the outcome of the game is a winning outcome, then the player may be provided with an award such as coins or currency, or credits which may be redeemed for prizes or money. In one arrangement, the award may be winnings in proportion to the amount wagered or bet by the player.

In order to accept a wager, the gaming machine 20 may include a coin acceptor 30 for accepting coins. The gaming machine 20 may also include a bill acceptor or validator 32 for accepting paper currency. The gaming machine 20 may be provided with other means for accepting or verifying value, such as a credit card reader.

In a preferred embodiment, the gamine machine 20 is associated with a player tracking system. Such a system may also be referred to as a player reward or player loyalty system. The details of this system are described in more detail below. In general the player tracking system includes a gaming machine player tracking device associated with a player tracking host system via a network including a communication link.

One arrangement of a gaming machine player tracking device is illustrated in FIG. 1. As illustrated, the device includes a top box 36 which is located at the top of the gaming machine 20. The top box 36 may have a variety of shapes and sizes. Generally, the top box 36 defines an interior space in which one or more components are located.

In one embodiment, the top box 36 includes a plurality of lights 38 for visual stimulation, at least one speaker 40 for generating audible information, and a bonus indicator 42 in the form of a video display. The lights 38 may be of a plurality of types and be arranged to display in various colors. The bonus indicator 42 may comprise a CRT type display, or an LCD/LED display or the like. As described in more detail below, the bonus indicator 42 may be arranged to display a wide variety of information, including player tracking information and information regarding bonuses.

The player tracking device of the gaming machine 20 also includes a card reader 34 for reading information associated with a player card. The player card may comprise a plastic card including a magnetic stripe. In that arrangement, the card reader may comprise a magnetic stripe reader. The player card may comprise a number of other devices, such as a smart card including a chip.

The player tracking device of the gaming machine 20 also preferably includes a keyboard or keypad 44 which permits input from a player. The keypad 44 is preferably associated with the player tracking function, such as for inputting a player identification or personal identification number (PIN).

The gaming machine player tracking device may have a variety of other configurations and include the other devices. For example, the player tracking device may be fully integrated into the gaming machine and not include a separate top box.

Figure 2:
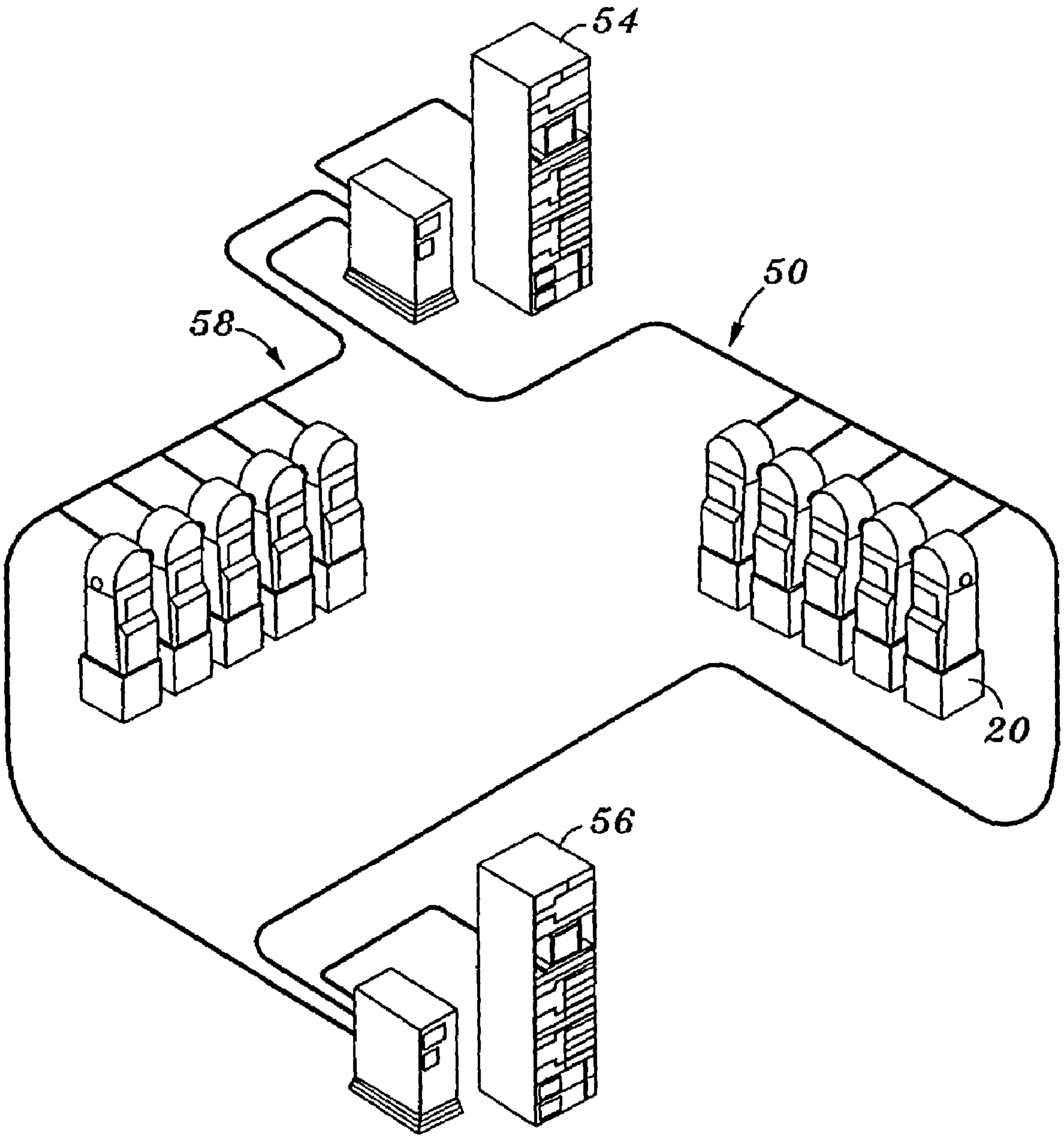
FIG. 2 illustrates a bonus system including a plurality of gaming devices of the type illustrated in FIG. 1.

Referring to FIG. 2, in a preferred embodiment, the player tracking device of the gaming machine 20 is associated with one or more other devices through a wired or wireless communication network 58 including at least one communication link. In one embodiment, the player tracking system includes at least one player tracking or reward system host 54. The player tracking or reward system host 54 is in communication with the player tracking device of the gaming machine 20 via the at least one communication link of the network 58.

The player tracking host 54 may comprise a single computer or a group of computers associated with one another on the network 58. Appropriate hardware and/or software is provided for permitting the one or more computing devices of the player tracking host 54 to send and receive information. For example, in one embodiment, data may be sent to and from the player tracking host 54 in accordance with any number of protocols, such as TCP/IP, Ethernet, IEEE-1394, Bluetooth and others. Appropriate hardware and software is provided for implementing these protocols. Of course, the communication protocol and the form of the network 58 are chosen in tandem. For example, the Bluetooth protocol may be implemented with a wireless network 58 including wireless data relay stations. An IEEE-1394 protocol may be implemented over a wired network, such as copper wire or fiber optic lines.

In one embodiment, the player tracking host 54 includes at least one data storage element for storing the player information. The data storage element may comprise a hard drive, RAM, tape drive, CD-ROM, DVD-RAM or other memory or data storage member or element. The player tracking host 54 may including a number of other devices, such as one or more displays, keyboards and other devices for displaying data, controlling operation thereof and the like.

In one embodiment, the player tracking host 54 is adapted to implement a player tracking/reward or "comp" function. The player tracking host 54 may thus be adapted to aggregate game play data regarding various players playing the gaming machines 20. This data may include information such as the length of time of game play, amounts bet, amounts awarded, and a wide variety of other information. In general, the player tracking device of each gaming machine 20 is adapted to transmit the player tracking data over the communications link(s) to the player tracking host 54. Based on player activities, a player may be awarded a "comp". Comps are generally awards, such as prizes, money, free game play, lodging or the like which are provided to the player apart from any awards which the player receives from direct game play. Such are referred to as "comps" as they are "complimentary" and generally do not require specific obligation, such as an additional bet, in order to be received. The system is often referred to as a reward or loyalty system because a player is generally awarded an award resulting from an extended or frequent game play. In one arrangement, a player may acquire points based upon a game criteria, such as amounts bet, won or lost. If a player accrues sufficient credits, the player is awarded a reward.

FIG. 2 also illustrates an embodiment of a bonus system 50 in accordance with the present invention. In general, the bonus system 50 is associated with at least one gaming machine 20. As illustrated, in a preferred embodiment, the bonus system 50 is associated with a plurality of gaming machines 20. Each gaming machine 20 is arranged to present one or more games to a player and may be of the type described above and illustrated in FIG. 1.

In a preferred embodiment of the invention, the bonus system 50 is associated with and/or shares certain aspects of the player tracking system. In a preferred embodiment, the bonus system includes a bonus system host 56. The bonus system host 56 may comprise a similar arrangement of hardware to the player tracking host 54. In one embodiment, the player tracking host 54 and bonus system host 56 may comprise the same device or devices arranged to implement both player tracking and bonus functions in accordance with the invention. As described in more detail below, the bonus system host 56 is arranged to generate bonus information, including bonus award information to a player or prospective player of a gaming machine.

In general, the bonus system host 56 is arranged to generate bonus information and transmit it to the player tracking device associated with a gaming machine 20. The information is transmitted via a communication link of the player tracking network 58. Information may also be transmitted from the player tracking device associated with a gaming machine 20 to the bonus system host 56. The types of information which may be transmitted are described below.

Figure 3:
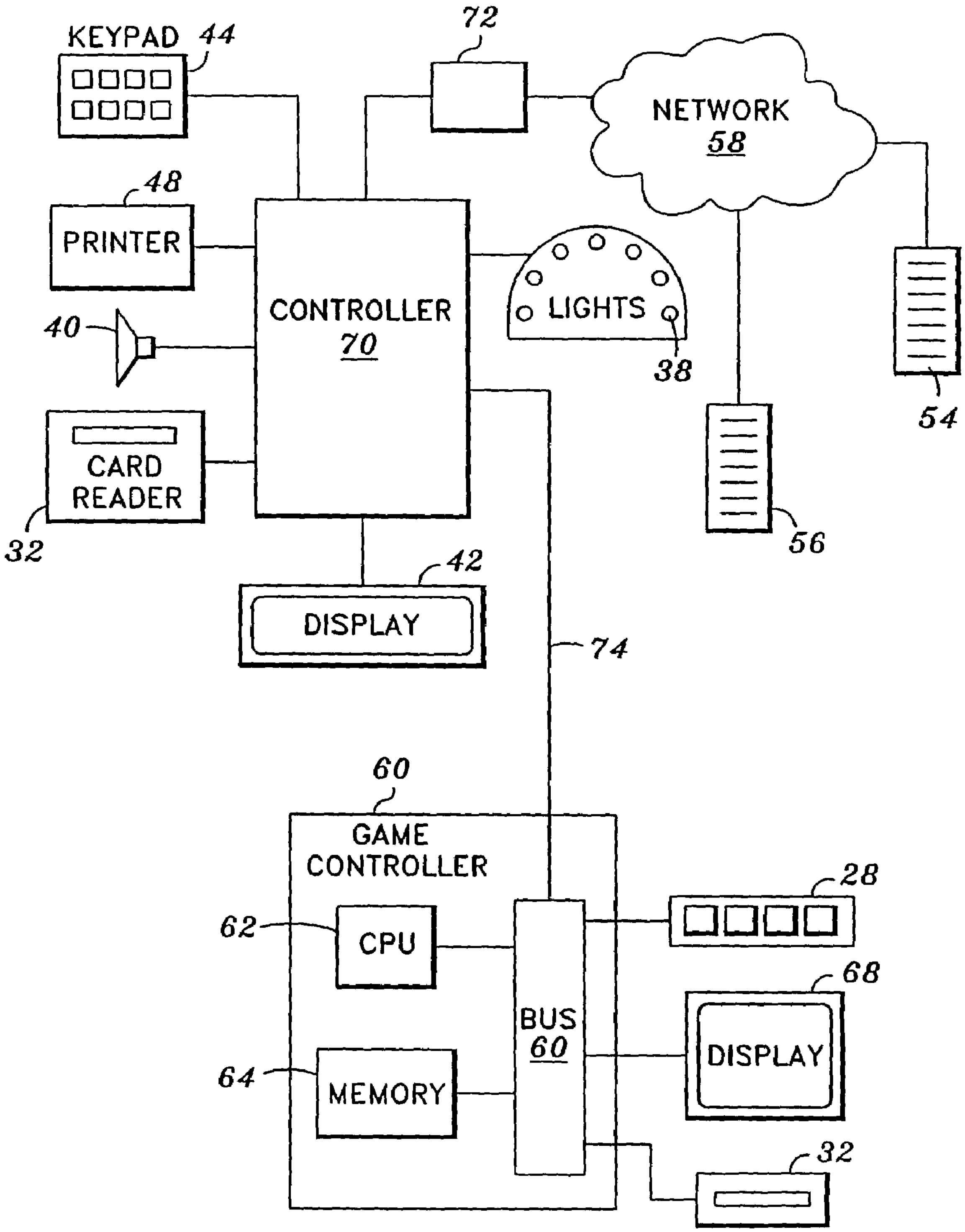
FIG. 3 illustrates in block-diagram form one embodiment of an implementation of the bonus system illustrated in FIG. 2.

Referring to FIG. 3, there is illustrated a particular arrangement of a bonus system 50 in accordance with the present invention. As illustrated, the gaming machine 20 includes a gaming machine controller 60. In general, the gaming machine controller 60 is arranged to facilitate the presentation of a game to a player of the gaming machine. In one embodiment, the gaming machine controller 60 includes a processing device 62 and a memory 64 associated with a bus 66. The memory 64 is arranged to store information, such as game software/code for execution by the processing unit 62. The processing unit 62 outputs instructions/data through the bus 66 for controlling one or more peripheral devices of the gaming machine for presenting the game. As illustrated, the peripheral devices may include a display 68. In the case of a slot game, the display 68 may comprise one or more reels. In the case of video poker and other games, the display 68 may comprise a CRT, LCD or the like. Other peripherals may include the above-referenced keys or buttons for accepting user input, and a coin acceptor/bill validator. The gaming machine controller 60 may be located in an internal portion of the gaming machine. In general, the arrangement of a gaming controller and its method of operation in presenting a game is well known.

The player tracking device associated with the gaming machine preferably includes a control device. In general, the control device is adapted to execute instructions/perform tasks, and transmit information or data from the gaming machine to a remote location via the player tracking system network 58. As part of the tasks, the control device is adapted to control one or more peripheral devices, such as the lights 38 and printer 48.

In one embodiment, the control device comprises a slot management interface board (SMIB) 70. The SMIB 70 may have a variety of forms and configurations. In one embodiment, the SMIB 70 comprises a circuit board having circuits configured to execute or implement a variety of instructions/tasks.

In one embodiment, the SMIB 70 is arranged to control or interface with one or more peripheral devices. In a preferred embodiment, these devices include the bonus indicator or display 42, the keypad 44, the card reader 34, the lights 38, the at least one speaker 40, and the printer 48. The SMIB 70 and the peripheral devices may be arranged to communicate using a variety of protocols, such as USB, serial or parallel.

In one embodiment, the SMIB 70 is housed in the top box 36 of the player tracking device associated with the gaming machine 20. The SMIB 70 may be located elsewhere, however.

As illustrated in FIG. 3, a communication interface 72 is provided between the SMIB 70 and the player tracking system network 58. The communication interface 72 may comprise a wide variety of devices. For example, the communication interface 72 may comprise a modem or a PC type card including an antennae for implementing a wireless communication protocol such as Bluetooth. The communication interface 72 may comprise a PC type card facilitating a protocol over a wired network, such as Ethernet or Firewire®.

Player tracking information is transmitted via the SMIB 70 to the player tracking host 54. In one embodiment, data is transmitted from the SMIB 70 to the network 58 via the communication interface 72. This data is routed to the player tracking host 54.

In one embodiment, the information which is transmitted comprises game play information regarding a player's game play activity. This information may include coins (or other monetary amounts credited), coins paid out, and time of play. In one embodiment, a communication link 74 is provided between the master gaming controller 60 and the SMIB 70 for transmitting this game play information. Game play information from the master gaming controller 60 is transmitted to the SMIB 70 via this link 74. The SMIB 70 may be arranged to manipulate the transmitted information, such as by changing its form for transmission to the player tracking host 54. In a preferred embodiment, the communication link 74 operates by a proprietary protocol which permits only limited interaction between the SMIB 70 and gaming controller 60. This proprietary protocol is preferably different than the communication protocol by which the SMIB 70 transmits information to and receives information from the network 58, including the player tracking host 54. In this manner, attempts to tamper with the master gaming controller 60 via access through the network 58 and SMIB 70 are prevented. This ensures the security of the master gaming controller 60.

In one or more embodiments, the SMIB 70 may be arranged to direct information to either or both the player tracking host 54 and the bonus system host 56. For example, the SMIB 70 may send information regarding a "card in" or "card out" event associated with the card reader 32 of the gaming machine 20 to both the player tracking host 54 and bonus system host 56. The "card in" event may comprise a player inserting their player card into the card reader 32 of the gaming machine 20. The "card out" event may comprise a player removing their card from the card reader of the gaming machine 20. Other information may be transmitted instead of or in addition to the card in/card out event.

In one embodiment, information may be transmitted from the player tracking host 54 to the bonus system host 56. For example, the player tracking host 54 may be arranged to transmit a signal to the bonus system host 56 that a player has activated their account and is playing a particular gaming machine. Information may also be transmitted from the bonus system host 56 to the player tracking host 54. For example, the bonus system host 56 may send information regarding a number of credits awarded to a particular player of a gaming machine 20.

Further aspects of the player tracking function(s) will now be described. In one embodiment, an account is created for each user of the player tracking system. In order to participate in the reward or tracking system, a player may be required to provide certain information, including identification information. This may be provided by filling out a request form providing the information. A casino or other gaming machine operator may then generate an account for that player. The player's account information may be stored at a data storage device of the player tracking host.

The player is issued a player tracking card. This card includes identification information, such as a unique player identification code. When a player wishes to play the gaming machine, the player inserts their player tracking card into the card reader 34. The card reader 34 reads the player identification code. This code is transmitted to the player tracking host 54 via the SMIB 70 and the player tracking system network 58. Insertion of the card and transmission of the identification code may be used to identify the start of a game player session of that particular player.

In one embodiment, in response to receiving the identification code, the player tracking host 54 may send a prompt requesting that the player input a personal identification number (PIN) or other code. The prompt from the player tracking host 54 may cause the SMIB 70 to cause the display 42 to display a request to the player that the player input their PIN.

A player may input their PIN using the keypad 44. The PIN is transmitted to the player tracking host 54 where it is verified against a PIN stored in association with the player's identity. If the player's PIN is correct, then an indication of such may be provided, and an instruction that the player may begin game play may be provided. Game play activity data may thereafter be obtained and transmitted to the player tracking host 54. The game play activity data may be manipulated and stored. In one embodiment, the player tracking host 54 may be arranged to associate information with the player's account. This information may comprise awarded points which may be redeemed for prizes or awards, such as free game play.

Of course, the player tracking system may have a wide variety of features other than or different than those described herein. Further, the player tracking system may be arranged in a wide variety of configurations and include other components that described herein.

Additional details of the bonus system 50 will now be described, still with reference primarily to FIG. 3. In a preferred embodiment, one or more bonus events are presented using the bonus system 50.

In accordance with the present invention, there is provided a method of providing a bonus or an opportunity for a bonus. In one embodiment, bonus events are configured by the bonus system host 56. A variety of bonus events or bonuses may be configured.

In one embodiment, the bonus system host 56 is configured to generate a bonus for a player of a gaming machine 20. Once a player has identified themselves as playing a particular gaming machine 20 via the player tracking system, the bonus system host 56 may provide a bonus award to that player. In one embodiment, the bonus system host 56 is arranged to activate an opportunity for awarding a bonus when a player begins playing a gaming machine. The start of game play may be identified by the player inserting their player tracking card into the card reader of the player tracking device associated with the gaming machine 20. In one embodiment, when the player's card is inserted, the SMIB 70 is arranged to send a signal of such to the bonus system host 56. The particular player tracking device or the gaming machine with which the player tracking device is associated may be identified to the bonus system host 56, such as by a unique code. The bonus system host 56 may then transmit bonus information to that particular gaming machine. As is known in the art of communications, the bonus system host 56 may send packetized information including a destination header which dictates that the information only be directed to or accepted by the intended destination, such as a particular player tracking device associated with a particular gaming machine.

In another embodiment, game play may be determined by a player providing credits to the machine, such as coins or bills input to the machine. Game play may also be determined by actual game play. In such event, the master gaming controller 60 may be arranged to send a signal regarding the initiation of game play to the SMIB 70, which in turn sends a corresponding signal to the bonus system host 56.

A variety of specific circumstances or events may be used as criteria for awarding a bonus, including the timing of the bonus and the value of the bonus. In one embodiment, a bonus may be based upon the play information. For example, in the event a player loses a predetermined amount of money, such as evidenced by total coins in compared to total coins out while playing the machine, then the bonus host 56 may be arranged to generate a bonus award for the player. In one embodiment, the bonus system host 56 may poll the player tracking host 54 to determine the existence of one or more players who satisfy the criteria for a bonus. For example, at predetermined intervals the bonus system host 56 may poll the player tracking host 54 for the identity of players (as associated with particular player tracking devices of particular gaming machines) who have suffered losses of a certain amount. In another embodiment, the player tracking host 54 may be configured to determine such and directly provide the results of such to the bonus system host 56. The bonus system host 56 may be arranged to provide a bonus based on other criteria, such as an indication that a player has placed a certain number of bets, bets in of a certain value, or the like.

In one embodiment, a bonus may be awarded to a player of a game machine 20 randomly. For example, the bonus system host 56 may include a random number generator, where the selected numbers are associated with a bonus or no bonus, and in the case of a bonus, a bonus amount. In one embodiment, the bonus system host 56 is arranged to randomly generate bonuses and provide them to active players. As described above, an active player may be identified by their use of a player tracking card or by other events associated with the gaming machine. The timing and size of a bonus is determined by the outcome of the selection of the random numbers.

In one embodiment, a bonus event may be triggered and then a bonus awarded only if one or more events occur thereafter. In this arrangement, bonus information may be generated by the bonus system host 56 and be transmitted to one or more player tracking devices associated with gaming machines. In a preferred embodiment, the player tracking device is arranged to provide the bonus event information to players or prospective players, such as by the display 42 and/or speaker 40.

In one embodiment, a bonus may be provided to a player based on the player's performance of certain acts. The bonus system host 56 may transmit bonus event information to one or more of the player tracking devices, and the existence of the opportunity of a bonus may then be disseminated. In one embodiment, the existence of the opportunity for the bonus and the criteria for obtaining the bonus are displayed in text form via the display 42 and/or provided by audible instruction via the speaker 40.

In one embodiment, a bonus may be awarded to a player who performs a certain act. As one example, the bonus may be awarded to the first player to play a particular gaming machine 20 which is presently not being played. In one embodiment, the bonus is awarded to the first player to utilize their player tracking card with the player tracking device associated with the gaming machine 20. For example, the bonus may be awarded to the first player to insert their player tracking card and correctly identify themselves.

In one embodiment, a bonus may be indicated at a machine or group of machines in order to entice greater play at that machine or group of machines. For example, the bonus host 56 may send bonus information to a particular machine or group of machines to entice play. In one embodiment, bonuses may be awarded by the bonus system host 56 only to a player of a selected machine or to players of a group of machines. The bonus system host 56 may cause the display of information on the display 42 that a player of the machine may be awarded a bonus while playing that particular machine.

Preferably, when a bonus is awarded, a bonus event occurs which includes a visible and/or audible indication of the award. In one embodiment, the bonus host 56 transmits a signal or data over the network 58 to the SMIB 70 causing the SMIB 70 to display information regarding the bonus on the display 42, to produce audio information via the speaker 40, and illuminate the lights 38. In one embodiment, the lights 38 may be caused to illuminate or flash, and a variety of sounds may be produced by the speaker 40 creating a festive atmosphere.

In one embodiment, the bonus may comprise a monetary award, an award representative of a monetary award, a non-monetary prize or an award representative of a non-monetary prize. In a preferred embodiment, the bonus comprises credits associated with the player's account, which credits may be used for game play or as the basis for another award. For example, in one embodiment, a player utilizing the player tracking system may be awarded points based on their play of a gaming machine. The points may be based upon the total coins in or out, the difference between coins in and out, theoretical win or loss, or other criteria. In any event, a player may be permitted to redeem the points associated with their account for an award. In one embodiment, when a player is awarded a bonus, the bonus may comprise points associated with the player's account.

In one embodiment, a ticket may be dispensed which is representative of money or another type of award. The ticket may be printed and issued utilizing the printer 48 associated with the SMIB 70. The ticket may be redeemable for a prize or monetary award, such as consumer goods, lodging, meals, tokens or the like. The ticket may also comprise a coupon which entitles the player to a reduced price for goods or services. In one embodiment, the ticket may be readable by another device and used in place of money. Such a ticket and a method of using a ticket in lieu of cash is disclosed in U.S. application Ser. No. 09/648,382 which is incorporated herein in its entirety. A ticket may also be printed as a receipt evidencing to a player that an award, such as credits, has been printed.

The bonus system of the invention may be arranged in fashions other than as described above, and may operate in other manners. For example, in one embodiment the bonus system may be arranged to award a bonus to a player of a gaming machine regardless of whether the player of that machine is currently identified via the player tracking system. This arrangement has the benefit that while the bonus system utilizes the player tracking system for providing the bonus, the player who is awarded the bonus need not have a player tracking account or have activated their account during the session of play.

In accordance with the invention, the manner by which the method is implemented, including the manner and form of communication, may vary. For example, the form of the bonus event information generated and/or transmitted by the bonus system host 56 may vary. Depending on the system, the information may be in the form of an analog or digital signal. In one embodiment, a particular signal from the bonus system host 56 may trigger the execution of certain events by the SMIB 70. For example, the SMIB 70 may be arranged to display certain bonus information in response to one signal, and other bonus information in response to a different signal received from the bonus system host 56. In another embodiment, the bonus event information generated by the bonus system host 56 may comprise data used by the SMIB 70, such as particular video data which when provided to a video driver causes the display to display certain information, such as details in the English language regarding how to be awarded a bonus.

It will be appreciated that the bonus system host 56 may be located remote from the gaming machine 20. Further one or more gaming machines 20 which are located remote from one another may be associated with the same bonus system host 56. The one or more gaming machines 20 may be associated with different gaming properties or operators, or a variety of properties or locations operated by a single party. In such an embodiment, the one or more communication links forming the network 58 may comprise phone lines or the link connecting the properties. For example, the network 58 may form a WAN. In these arrangements, a portion of the wagers placed with gaming machines 20 which are associated with the bonus system 50 may be used to fund the prizes or bonuses which are awarded via the bonus system 50.

The bonus system and method of providing a bonus in accordance with the present invention has numerous advantages. First, there is provided a bonus system which may be implemented via an existing player tracking system or other system associated with a gaming machine. In many instances, the master gaming controller of a gaming machine is not associated with a network or system directly. Instead, the master gaming controller is provided with all of the necessary hardware and software for presenting one or more games. The ability to provide a bonus or award via an existing system eliminates the need to reconfigure the master gaming controller 60 to do so, including the need to associate the master gaming controller 60 with a communication link. In addition, the implementation of the bonus system via another system reduces the amount of time and expense of implementing the bonus system per se.

In one or more embodiments, the bonus system may be associated with other systems or networks providing communication to the gaming machine. For example, an existing gaming machine may be fitted for credit card use. A credit card reader, controller and communication interface may be associated with the gaming machine, and a communication path established from the interface to a remote location, such as via an installed cable. In accordance with the present invention, the bonus system may be implemented on this credit card network. Preferably, additional peripheral devices are associated with the credit card controller, such as lights, a display and the like. In another arrangement, a separate bonus system controller may be provided in communication with the bonus system host via the communication path/link of the credit card system.

One unique aspect of the invention is that the bonus system is not associated directly with the gaming controller or the play of the game. A bonus is not directly dependent upon the outcome of the game played at the gaming machine or upon other aspects of play of the game which is presented by the gaming machine. Because of the disassociation of the bonus system from the gaming machine and the game(s) presented at the gaming machine, a much larger variety of bonuses and criteria for bonuses may be provided.

One advantage of the bonus system is that it may be used to generate play at one or more particular gaming machines. For example, a casino may identify that a particular type of machine or a group of machines in a particular area are experiencing a low play volume. In order to entice greater play of those machines, the casino may arrange for bonuses to be awarded at those machines using the bonus system.

Another advantage of the bonus system is that it may be used to increase the use of a player tracking system. From the perspective of a gaming operator, the advantages of a player tracking system are well known. Player tracking systems provide gaming operators with information which is useful in marketing and in operation. In one embodiment, a player may not be awarded a bonus unless that player is using the player tracking system, either by having an established account or by actually having their account activated while playing a gaming machine. As noted above, in one embodiment, a player may be awarded a bonus by being the first player to insert their player card into the card reader of the player tracking device associated with a gaming machine. In another embodiment, a bonus may only be awarded to a player of a machine identified as actively playing a game via their player tracking card activation. In these arrangements, a player is enticed to use the player tracking system.

It will be understood that the above described arrangements of apparatus and the method therefrom are merely illustrative of applications of the principles of this invention and many other embodiments and modifications may be made without departing from the spirit and scope of the invention as defined in the claims.

I claim:

1. A method of awarding a bonus award at a gaming machine in order to increase play at one or more gaming machines comprising:

providing at least one gaming machine having a player tracking device including a card reader, a keypad, and at least one display, said player tracking device configured to receive information regarding game play at said gaming machine;

configuring bonus event information by a bonus system host;

transmitting bonus event information from said bonus system host via a communication link to said player tracking device;

displaying bonus event information at said display of said player tracking device when said gaming machine is not being played;

obtaining player information from a player card of a player provided to said card reader;

configuring bonus award information about said bonus award by said bonus system host in response to said player card provided to said card reader and without requiring actual game play at the one gaming machine;

notifying said player of said bonus award;

transmitting said bonus award information from said bonus system host to said player tracking device to communicate said bonus award information on said display; and awarding said bonus award to said player.

2. The method in accordance with claim 1 wherein said bonus event information comprises information informing players that a first player to utilize said gaming machine is entitled to a bonus award.

3. The method in accordance with claim 2 wherein said configuring said bonus award information occurs if said player card is the first card provided to said card reader after said bonus event information is displayed.

4. The method in accordance with claim 1 including:

providing a plurality of gaming machines, displaying said bonus event information at said plurality of gaming machines, and configuring bonus award information in response to the first card provided to the card reader of one of said plurality of gaming machines.

5. The method in accordance with claim 1 including:

providing a plurality of gaming machines, displaying said bonus event information at said plurality of gaming machines, and randomly selecting one of said gaming machines at which a player has provided their card to said card reader and transmitting said bonus award information to said selected gaming machine.

6. The method in accordance with claim 1 wherein said notifying is performed through an audible indicator.

7. The method in accordance with claim 1 wherein said notifying is performed through a visual indicator.

* * * * *